Patented Nov. 25, 1952

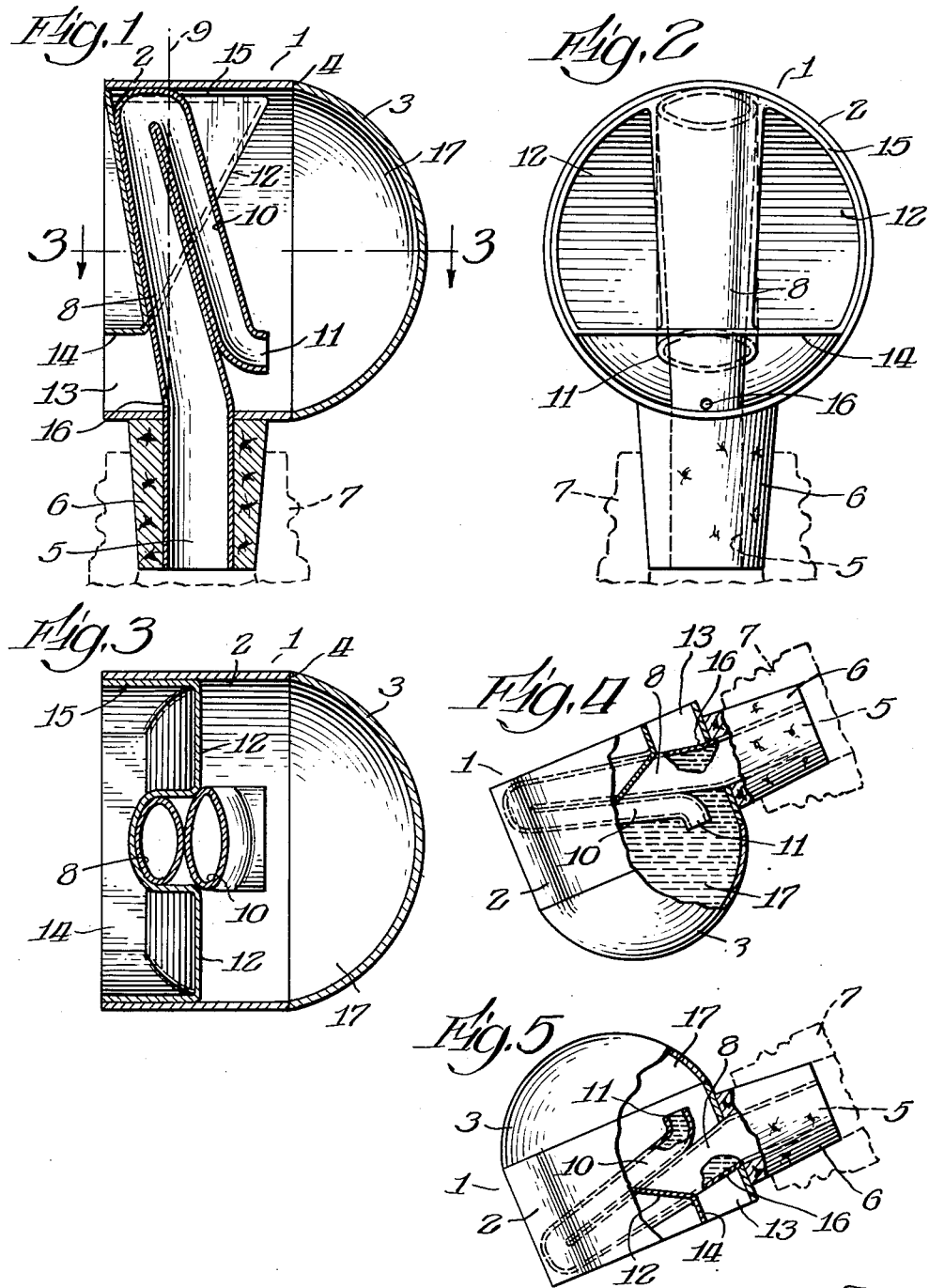

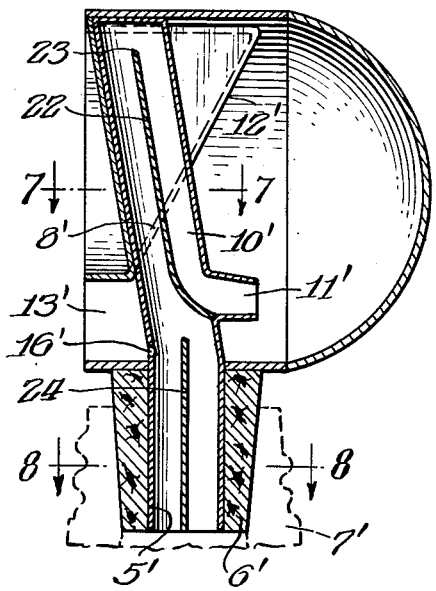
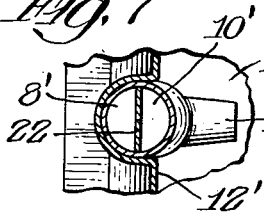
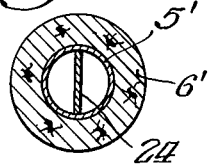
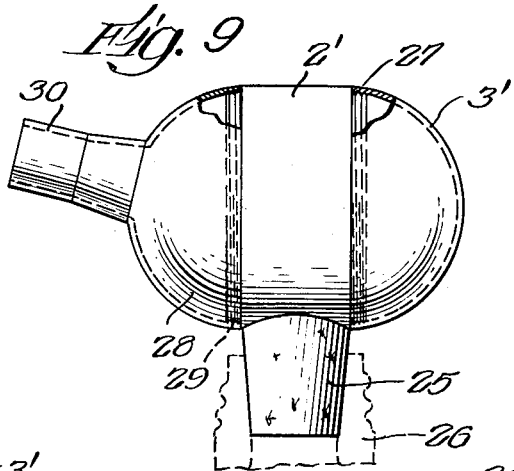
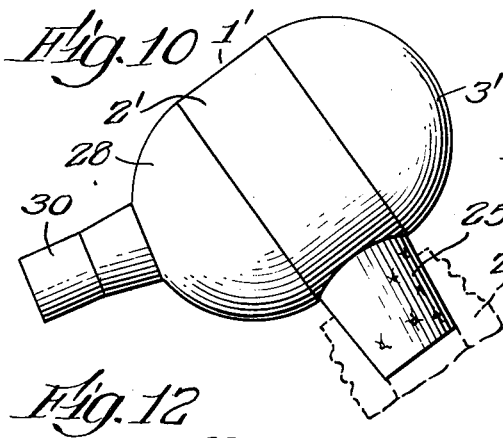
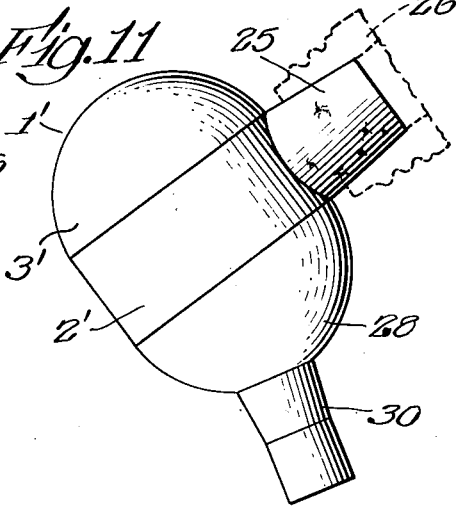
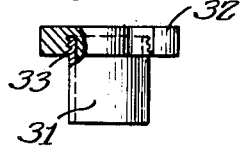

2,619,263

UNITED STATES PATENT OFFICE 2,619,263

LIQUID MEASURING AND POURING ATTACHMENT

William H. Duggan, Chicago, Ill.

Application July 14, 1947, Serial No. 760,721

12 Claims. (Cl. 222—454)

This invention relates, in general, to liquid measuring and dispensing devices, and has particular relation to an improved liquid measuring and pouring attachment adapted to be applied to the neck of a bottle or other container outlet, and which is operable to dispense predetermined quantities of liquid from the bottle or other container.

While the liquid measuring and pouring attachments of the present invention are particularly adapted for pouring measured amounts of alcoholic liquor, such as whiskey, brandy, rum and the like, they are also adapted for pouring cordials, wine and other liquids, for example, bleaching fluid, water, medicine, oil, and for all similar purposes.

Previously proposed devices of the class described have not been entirely practical and satisfactory under all conditions of operation. Some are operative under certain conditions—for example, when the container is comparatively full and the device is carefully manipulated in a certain manner—but will not function properly when the container is not comparatively full, or where the device is not carefully manipulated. Others have been complicated in construction and expensive to manufacture, and have frequently required moving parts. Still others will not function except with certain liquids, or have been difficult, if not impossible, to clean, or have been otherwise objectionable.

Moreover, in certain devices previously proposed, delivery of liquid through the outlet commences upon tilting the container, the measuring action being intended to take place simultaneously with the dispensing action, which is objectionable because the desired amount of liquid cannot be measured in transferring the bottle or other container from one place to another and then, when in proper position, poured or dispensed from the device.

One of the main objects of the present invention is to provide an improved form of measuring and pouring attachment for accurately measuring and delivering predetermined measured quantities of liquid from a bottle or other container.

Another object of the invention is to provide a measuring and pouring attachment which requires no moving parts, may be readily applied to existing bottles or other containers, and with which problems previously presented are avoided.

Another object of the invention is to provide a device of the class described which is practical and will operate satisfactorily under all conditions of operation, and, more particularly, a device which will operate when the container is not comparatively full as well as when it is comparatively full, and which does not require careful manipulation of the device at certain angles or in a certain manner.

Another object of the invention is to provide a device of the class described which is transferrable from one place to another with an accurately measured amount of liquid therein and with which the desired amount of liquid may be measured in transferring the bottle or container from one place to another so that the predetermined amount of liquid may then be poured from the device when it reaches pouring position.

Another object of the invention is to provide a device which will operate to pour or dispense the measured amount of liquid when the outlet of the bottle or other container is tilted obliquely upwardly as well as when it is tilted obliquely downwardly.

Another object of the invention is to provide a measuring and pouring attachment of the class described having various features of novelty and advantages, and which is particularly characterized by its simplicity in construction, its economy in manufacture, its effectiveness in use; also by the absence of moving parts or the like, and by the ability of the device to be conveniently applied to and removed from the bottle for use with different bottles or containers.

Further objects and advantages of the invention will appear from the following detailed description, taken in connection with the accompanying drawings which illustrate the manner of constructing and using certain illustrative embodiments of the invention.

In the drawings:

Figure 1 is a vertical sectional view through a measuring and pouring attachment embodying the present invention, showing the neck of a bottle or other container outlet fragmentarily in dotted lines;

Figure 2 is a front view of the device shown in Figure 1;

Figure 3 is a detail section taken on the line 3—3 of Figure 1;

Figure 4 is a side elevational view of the device partially in section and showing the same in position for measuring a predetermined quantity of liquid;

Figure 5 is a view similar to Figure 4 showing the device in position for pouring or dispensing the measured amount of liquid therefrom;

Figure 6 is a sectional view showing a modified form of pouring tube;

Figure 7 is a detail section taken on the line 7—7 of Figure 6;

Figure 8 is a detail section taken on the line 8—8 of Figure 6;

Figure 9 is a side elevational view partially in section of one complete form of measuring and pouring attachment embodying the present invention, showing end members adapted for removal from the intermediate ring;

Figure 10 is a side elevational view showing the device of Figure 9 in pouring position, with the neck of the bottle tilted obliquely upwardly;

Figure 11 is a view similar to Figure 10 showing the device in pouring position, with the neck of the bottle tilted downwardly;

Figure 12 is a side elevational view, partially in section, of a closure cap for the pouring spout of the device shown in Figure 9; and Figure 13 is an end view of the closure cap shown in Figure 12.

Referring now to the drawings, the embodiment of the invention shown in Figures 1 through 5 comprises a receptacle designated generally at 1 and consisting, for example, of an annular or ring-like member 2 having a semispherical end member 3 secured at 4 to one end of the ring 2.

The receptacle 1 has an inlet comprising a tube 5 projecting radially through the ring 2 and suitably secured to the adjacent wall thereof. The outwardly projecting end of tube 5 preferably has secured thereon a sleeve or jacket 6 comprising, for example, a cork cored axially to receive the tube 5. The outer surface of cork 6 is shown of tapered form, with its smaller diameter at the inner end of the tube. This facilitates introduction of the cork 6 into the neck of the bottle shown fragmentarily in dotted lines at 7, or into any other container outlet with the tube 5 in the cork and the receptacle 1 on the tube.

In this embodiment of the invention, the tube 5 is of cylindrical form from its lower end to approximately the inner surface of the ring 2. Outwardly of the inner surface of ring 2 the tube is flattened for compactness endwise of receptacle 1 to generally oval or flattened form, for example, as shown in Figure 3. The flattened outer end of tube 5, which is disposed within receptacle 1, is of double curved or recurved form. The first leg 8, which extends from the cylindrical inlet end of the tube, extends diametrically through the ring 2 at an angle of about 20° toward the outlet or pouring side of receptacle 1, or relative to the dot and dash line shown at 9, which is a longitudinal extension of the adjacent side of the cylindrical inlet end or combined liquid and air passage of the tube. At the inner periphery of the outer side of the ring 2 the tube is turned back to form the second leg 10 which extends inwardly parallel to leg 8, the inner end of leg 10 terminating in relatively close proximity to the inner side of receptacle 1 and being preferably turned at 11 toward the closed end 3 of the receptacle.

A partition 12 is arranged at about a 30° slant within ring 2 as the device is viewed in Figure 1. The inner end of partition 12 is spaced at 13 from the inner side of receptacle 1 and has a rectilinear flange 14 turned at substantially right angles toward the pouring side of the device and extending across ring 2 preferably below its axis. The outer periphery of partition 12 from one end of flange 14 to its opposite end is of circular or other form, according to the contour of the inner periphery of the ring 2, and has a marginal flange 15 which is secured in liquid-tight engagement to the adjacent portion of the inner periphery of ring 2.

The first leg 8 of tube 5 has a vent and drain orifice 16 which is positioned adjacent to the inner side of the adjacent portion of the wall of ring 2 and opens into receptacle 1 toward the pouring or outlet side of the receptacle. The orifice 16 is preferably about $\frac{1}{16}$ of an inch in diameter, or of a size which is not large enough to permit air and liquid to pass simultaneously in opposite directions through the orifice.

The chamber 17 defined within the receptacle 1 between partition 12 and the closed end 3 is the measuring chamber. It may be of any desired size according to the predetermined quantity of liquid which it is desired to pour or dispense from the bottle 7 or other container.

In pouring or dispensing a predetermined measured quantity of liquid from the bottle 7, the bottle is grasped in either hand and tilted to position with the neck or mouth of the bottle tilted downwardly, for example, at about 45°, or at any other desired angle, and with the pouring side of the receptacle 1 positioned upwardly as shown in Figure 4. In this position the vent and drain orifice 16 is directed upwardly. The liquid then flows downwardly from the bottle 7 and through the legs 8 and 10 and turned end 11 into the measuring chamber 17, filling the measuring chamber 17 up to orifice 16, which is the capacity of the measuring chamber 17, in about two seconds after the bottle is tilted.

As the bottle is tilted to pour a measured amount of liquid therefrom, air enters the bottle through the orifice 16. Air, upon entering orifice 16 and being lighter than the liquid, passes along the upper wall of the liquid inlet end of tube 5, as the device is viewed in Figure 4, and thru the liquid to fill the space vacated by the liquid which flows out of the bottle. The air in the measuring chamber 17 escapes through the outlet 13 formed by the space between the flange 14 and the adjacent side of the receptacle 1 as the measuring compartment is filled with liquid. When the measuring chamber 17 is filled with liquid up to orifice 16, this orifice is thus closed by the liquid, either inside or outside the leg 8 of tube 5. Consequently no more air can enter the first leg of the tube or the bottle 7 and, as a result, no further liquid flows from the bottle. A predetermined amount of liquid is thus measured accurately and in a simple manner in the measuring compartment 17 of receptacle 1.

Upon thus measuring the desired amount of liquid, the measured portion of liquid may be dispensed or poured from receptacle 1 by the simple expedient of turning the bottle, for example, about 180° about the axis of the inlet end of tube 5, or otherwise to position the measuring and dispensing device with the outlet side of receptacle 1 directed downwardly as shown in Figures 10 and 11. The user of the device can tell when the measuring space 17 is filled with liquid by the cessation of liquid flow from the bottle, or by observing the stopping of air bubbles entering the bottle; also by the discontinuance of gurgling noise as the measuring space 17 is filled to capacity with liquid, or by counting the seconds required to fill the measuring space.

The bottle is adapted to be transferred with the measuring space 17 filled with liquid from one place to another, or the measuring space 17 may be filled to measure the desired portion of liquid at the pouring position in transferring the bottle from one position to another. Then with the pouring device over the glass or other receptacle for receiving the measured amount of liquid, such measured amount of liquid is poured or dispensed into the glass or other receptacle as previously described.

With the pouring device in pouring position, as shown, for example in Figure 11, the measured amount of liquid in the measuring space 17 flows outwardly through the space or pouring outlet 13. With the device in pouring position, the double curved or recurved legs 8 and 10 of tube 5, due to the formation, angularity and proportioning thereof, form a liquid seal within the recurved tube to prevent the passage of air into the bottle. This prevents the flow of further liquid from the bottle in pouring or dispensing the measured amount of liquid from the receptacle 1, and particularly from the measuring space 17 thereof.

In one satisfactory embodiment of the invention, the tube 5 and ring 2 are formed of metal and the end member 3 is formed of polystyrene or other suitable synthetic resin or plastic material which will have no deleterious effects on the liquid contents of the bottle. The end member 3 may be fixedly secured to the adjacent end of the ring 2, for example, by molding it thereto, or otherwise, or it may be removably secured to the ring 2 by screwing it thereon and by making it interchangeable with other end members of different capacities, as will presently appear.

In the modified form of tube 5' shown in Figures 6, 7, and 8, the slanted or inclined passages 8' and 10', which correspond with the legs 8 and 10 of the tube shown in Figure 1, are formed by making the slanting trap forming portion of the tube of cylindrical or other desired form and separating the interior of the same by a diametrically disposed partition 22 terminating at 23 short of the outer closed end of the tube to place the passages 8' and 10' in communication. The turned end 11' in Figure 6 corresponds with the turned end 11 in Figure 1.

In Figures 6 and 8, the inlet end of tube 5' is shown provided with a partition 24 disposed diametrically across the interior thereof and extending longitudinally to divide the interior of the inlet of the tube into two channels of substantially equal and maximum size for the space available. This is in accordance with my copending application Serial No. 735,343, filed March 18, 1947, now Patent No. 2,536,160, dated January 2, 1951, but may, of course, be omitted or varied. The air inlet or vent and drain orifice 16', in Figure 6, is similar to the vent and drain orifice 16 in Figure 1. The remainder of the measuring and dispensing device with which the modified form of tube shown in Figure 6 is used may correspond with the device shown in Figure 1.

In the complete form of device shown in Figure 9, the ring 2' corresponds with the ring 2 in Figure 1. The cork through which the inlet tube opens is shown at 25, and the neck of the bottle or other container outlet is shown fragmentarily in dotted lines at 26. The double curved or recurved trap or liquid seal forming tube may be of the form shown in Figure 1 or of the form shown in Figure 6, or of any other suitable form within the scope of the present invention.

In Figure 9 the end member 3' screws at 27 removably onto the adjacent end of ring 2' and is interchangeable with other similar end members of different capacities so that the amount or volume of the measured portion of liquid to be dispensed from the device may be conveniently adjusted by applying an end member 3' of the desired capacity.

The opposite or pouring side of the ring 2' shown in Figure 9 has a semispherical end member 28 which screws at 29 onto the adjacent end of ring 2'. Suitable washers may, of course, be provided between the end members 3' and 28 and the adjacent ends of ring 2' to make the joints liquid tight. The end member 28 has a pouring spout 30 which may be tapered, as shown, tightly to receive a closed end tubular closing cap (Figures 12 and 13) which is adapted to be applied telescopically over the spout 30 when the device is not in use. The pouring spout 30 may be divided internally by a diagonally disposed or other suitable partition.

The form of the closure cap may be varied widely, but in Figures 12 and 13 I have shown a cap comprising tubular part 31 onto the outer end of which an end closure member 32 is screwed at 33. The end closure member 32 may be of winged form, or of any other suitable form adapted to be conveniently grasped with the fingers. The closure cap, and particularly the tubular part thereof, may be used for coring the cork for reception of the tubular inlet of the attachment.

With the device of Figure 9 the predetermined quantity of liquid is measured by filling the measuring chamber to capacity in the manner described in connection with Figures 1 through 5. However, with the device of Figure 9 the measured portion of liquid may be poured or dispensed from the device by tilting the bottle or container 26 to obliquely upwardly tilting position as shown in Figure 10, or to obliquely downwardly tilted position as shown in Figure 11, or to any tilted position intermediate the positions shown in Figures 10 and 11. This provides for pouring with the outlet of the bottle directed upwardly; also for pouring through at least a 90° range of tilted positions of the bottle, it being understood that the position shown in Figure 10 is not necessarily the limit of the upwardly tilted positions, and that the position shown in Figure 11 is not necessarily the limit of the downwardly tilted positions.

When the measured amount of liquid is poured with the bottle in downwardly tilted position as shown, for example, in Figure 11, the liquid flows outwardly and it passes through the spout 30 which is approximately at right angles relative to the liquid inlet tube which enters the neck of the bottle or container outlet. As before, the double curved or recurved tube or passage within the receptacle 1' produces a liquid seal within the recurved tube or passage to prevent the passage of air into the bottle or other container, which prevents the flow of further liquid from the bottle in pouring in downwardly tilted positions.

In pouring with the bottle or container inclined upwardly as shown in Figure 10, the liquid in the recurved tube drains back into the bottle, but no further liquid can flow from the bottle in pouring in upwardly inclined position because of the upward inclination of the bottle or other container.

Various modifications in the structural make-up of the device are contemplated within the scope of the present invention. I contemplate making the inlet tube and trap or liquid seal portion thereof and the partition, such as the partition 12 of Figure 1, in two complementary halves which may be cemented, molded, soldered or otherwise joined together. Where any of the parts of the device are made of metal it is to be understood that such metal will probably be of a character or plated or treated to be of a character which will have no deleterious effect on the liquid contents of the bottle.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In a liquid measuring and pouring attachment comprising, in combination, a receptacle having a liquid measuring space and a first single tubular passage adapted for application to a container outlet, said single tubular passage constituting both a liquid passage and an air passage, said receptacle being closed at one end and having a pouring outlet at the other end, means defining a generally U-shaped combined liquid and air passage having a first leg extending outwardly from said first passage at an inclination toward the outlet end of the receptacle and a second leg extending inwardly substantially parallel with said first leg to position in proximity to the inner side of the receptacle, the first leg of said generally U-shaped passage having a vent and drain orifice adjacent to the inner side of the receptacle and opening toward the outlet end of the receptacle, and a partition in the receptacle defining the measuring space between it and the closed end of the receptacle, said partition terminating in spaced relation to the inner side of the receptacle to form the pouring outlet therebetween.

2. A liquid measuring and pouring attachment comprising, in combination, a receptacle having a liquid measuring space and a first single tubular passage adapted for application to a container outlet, said single tubular passage constituting both a liquid passage and an air passage, said receptacle being closed at one end and having a pouring outlet at the other end, means defining a generally U-shaped combined liquid and air passage having a first leg extending outwardly from said first passage at an inclination toward the outlet end of the receptacle and a second leg extending inwardly substantially parallel with said first leg to position in proximity to the inner side of the receptacle, the first leg of said generally U-shaped passage having a vent and drain orifice adjacent to the inner side of the receptacle and opening toward the outlet end of the receptacle, and a partition in the receptacle defining the measuring space between it and the closed end of the receptacle, said partition terminating in spaced relation to the inner side of the receptacle to define the pouring outlet therebetween, said partition being inclined outwardly toward the closed end of the receptacle and in opposition to the direction of inclination of said generally U-shaped passage.

3. In a liquid measuring and pouring attachment, the combination comprising a receptacle having a liquid measuring chamber at one end thereof for measuring a predetermined quantity of liquid, means defining at the opposite end of the receptacle a pouring outlet leading from said measuring chamber, and means acting in one position of the attachment to deliver liquid into the measuring chamber and to prevent discharge of liquid through said pouring outlet and acting in a different position of the attachment to discharge the measured amount of liquid from the measuring chamber and to prevent delivery of liquid to the measuring chamber, said last means defining within the receptacle and between the measuring chamber and the pouring outlet a generally U-shaped combined liquid outlet and air inlet passage having an inlet leg disposed across the inner end of the pouring outlet, with a liquid inlet at one end of the U-shaped passage for communication with a container outlet, said U-shaped passage having a liquid outlet at its opposite end for delivering liquid to said measuring chamber when the device is in position for filling the measuring chamber, said inlet leg having a single liquid drain and air orifice opening into the same from said pouring outlet and positioned to be sealed by the liquid when the measuring chamber is filled with liquid, whereby to terminate flow of liquid into the measuring chamber, said pouring outlet when the attachment is in pouring position delivering only the measured amount of liquid from the measuring chamber.

4. A liquid measuring and pouring attachment according to claim 3 wherein the measuring chamber has an imperforate wall at the end of the receptacle opposite the end from which the pouring outlet discharges liquid from the measuring chamber.

5. A liquid measuring and pouring attachment according to claim 3 wherein one end of the liquid measuring chamber is defined by an end member removably attached to the adjacent end of the receptacle to permit adjustment of the capacity of the measuring chamber.

6. A liquid measuring and pouring attachment according to claim 3 wherein one end of the liquid measuring chamber is defined by an end member having screwed engagement with the adjacent end of the receptacle to permit adjustment of the capacity of the measuring chamber.

7. A liquid measuring and pouring attachment according to claim 3 wherein the liquid inlet end of the generally U-shaped combined liquid outlet and air inlet and outlet passage is normally directed downwardly when the attachment is not in measuring or pouring position to drain the liquid content of the attachment back through said liquid inlet end.

8. A liquid measuring and pouring attachment according to claim 3 wherein the liquid inlet end of the generally U-shaped combined liquid outlet and air inlet and outlet passage is normally directed downwardly when the attachment is not in measuring or pouring position to drain the liquid content of the attachment back through the air orifice and the liquid inlet end of the U-shaped combined liquid outlet and air inlet and outlet passage.

9. A liquid measuring and pouring attachment according to claim 3 wherein the legs of the generally U-shaped passage are of flattened section for compactness in a direction endwise of the receptacle.

10. A liquid measuring and pouring attachment according to claim 3 wherein the generally U-shaped passage is formed of a single tube with a second leg of said passage bent inwardly from the outer end of the inlet leg.

11. A liquid measuring and pouring attachment according to claim 3 wherein the generally U-shaped passage is formed of a single tube and wherein there is a partition within the tube and defining the legs of the U-shaped passage.

12. A liquid measuring and pouring attachment according to claim 3 wherein the pouring outlet opens from the receptacle on each of the opposite sides of the generally U-shaped passage defining means.

WILLIAM H. DUGGAN.

REFERENCES CITED

The following references are of record in the file of this patent:

UNITED STATES PATENTS

| Number | Name | Date |
|---|---|---|
| 697,830 | Franc | Apr. 15, 1902 |
| 820,679 | Studley | May 15, 1906 |
| 846,931 | Miller | Mar. 12, 1907 |
| 1,066,127 | Lewis | July 1, 1913 |
| 1,601,723 | Elbert | Oct. 5, 1926 |
| 1,799,401 | Yancey | Apr. 7, 1931 |
| 1,924,809 | Schuelke et al. | Aug. 29, 1933 |
| 1,969,780 | Croft | Aug. 14, 1934 |
| 2,091,929 | Kappenberg | Aug. 31, 1937 |
| 2,121,424 | Colombo | June 21, 1938 |
| 2,343,024 | Pearl | Feb. 29, 1944 |
| 2,428,233 | Lividas | Sept. 30, 1947 |